(12) United States Patent
Kennemer et al.

(10) Patent No.: US 9,205,774 B2
(45) Date of Patent: Dec. 8, 2015

(54) MOUNTABLE LIGHT ASSEMBLY (71) Applicant: Tractor Supply Company, Brentwood, TN (US)

(72) Inventors: Brian Kennemer, Chapel Hill, TN (US); Ty Rager, Hendersonville, TN (US)

(73) Assignee: Tractor Supply Company, Brentwood, TN (US)

(*) Notice: Subject to any disclaimer, the term of this patent is extended or adjusted under 35 U.S.C. 154(b) by 321 days.

(21) Appl. No.: 13/828,356

(22) Filed: Mar. 14, 2013

(65) Prior Publication Data

US 2014/0268775 A1  Sep. 18, 2014

(51) Int. Cl.
*F21V 21/00* (2006.01)
*B60Q 1/04* (2006.01)
*F21L 14/00* (2006.01)
*F21V 21/14* (2006.01)
*F21V 21/30* (2006.01)
*B60Q 1/05* (2006.01)
*B60Q 1/24* (2006.01)
*B60Q 3/06* (2006.01)
*F21V 14/02* (2006.01)
*F21V 17/00* (2006.01)
*F21W 131/10* (2006.01)
*F21Y 101/02* (2006.01)
*F21Y 103/00* (2006.01)

(52) U.S. Cl.
CPC ............. *B60Q 1/0483* (2013.01); *B60Q 1/05* (2013.01); *B60Q 1/24* (2013.01); *B60Q 3/065* (2013.01); *F21L 14/00* (2013.01); *F21V 21/145* (2013.01); *F21V 21/30* (2013.01); *F21V 14/025* (2013.01); *F21V 17/007* (2013.01); *F21W 2131/1005* (2013.01); *F21Y 2101/02* (2013.01); *F21Y 2103/003* (2013.01)

(58) Field of Classification Search
CPC .. B60Q 1/2615; B60Q 1/2692; B60Q 1/2696; B60Q 1/305; B60Q 7/02; B60R 5/04; B60R 5/041; F21V 21/14; F21V 21/145; F21V 21/28; F21V 21/30
See application file for complete search history.

(56) References Cited

U.S. PATENT DOCUMENTS

| | | | |
|---|---|---|---|
| 1,725,936 A * | 8/1929 | Rogovin | 362/352 |
| 4,745,525 A | 5/1988 | Sheehy | |
| 5,795,051 A | 8/1998 | Galanski | |
| 5,871,270 A * | 2/1999 | Ricker et al. | 362/485 |
| 6,238,068 B1 | 5/2001 | Farmer, Jr. | |

(Continued)

OTHER PUBLICATIONS

Exhibit A: Website printout from archive.org for "Pacer Outback F4 Rear LED Tailgate Light Bars" (1 page) (2008).

(Continued)

*Primary Examiner* — Y M Lee
(74) *Attorney, Agent, or Firm* — Lucian Wayne Beavers; Patterson Intellectual Property Law, PC (57) ABSTRACT

A light assembly for use in a work area that is mountable, portable, can be powered by moveable work equipment, and is capable of providing light necessary to adequately illuminate a work area so that work tasks can be completed. The mountable light assembly includes a housing containing a light source for illuminating a work area and a hanger for hanging the light assembly. The mountable light assembly may include an extension cord designed to be held in a storage compartment and pivotable wing housings containing wing light sources. For example, the light assembly may be designed to mount on the tailgate of a pickup truck and to draw power from a trailer power outlet.

25 Claims, 6 Drawing Sheets

(56) References Cited

U.S. PATENT DOCUMENTS

| | | |
|---|---|---|
| 6,799,873 B2 | 10/2004 | Fox |
| 7,834,750 B1 | 11/2010 | Hertz et al. |
| 7,993,041 B2 * | 8/2011 | Petelka .................. 362/485 |
| 2005/0146888 A1 | 7/2005 | Metcalf |
| 2011/0090072 A1 * | 4/2011 | Haldeman .................. 340/431 |
| 2013/0271993 A1 * | 10/2013 | Jan .......................... 362/249.09 |

OTHER PUBLICATIONS

Exhibit B: website printout from archive.org for "Plasmaglow FireStorm Scanning LED Tailgate Light Bars" (1 page) (2008).

Co-pending Design U.S. Appl. No. 29/470,517, filed Oct. 22, 2013.

* cited by examiner

_MOUNTABLE LIGHT ASSEMBLY_

BACKGROUND OF THE INVENTION

The present invention relates generally to a mountable light assembly. More particularly, but not by way of limitation, the light assembly may be mounted on the tailgate of a pickup truck for illumination of a work area located in a yard, a remote pasture, or near a barn, tool shed, or other building that is not equipped with access to electrical power.

Presently, when light is needed to illuminate a work area not conveniently located near a stationary electrical power outlet (e.g. a standard wall outlet), a worker will use a hand-held flashlight, or the worker will position a vehicle or other moveable work machinery such that the lights contained thereon face the direction of the work area.

BRIEF SUMMARY OF THE INVENTION

In one embodiment, a light assembly is provided for use in an outdoor or indoor work area that is mountable, portable, can be powered by moveable work equipment, and is capable of providing light necessary to adequately illuminate a work area so that work tasks can be completed. The mountable light assembly includes a main housing containing a light source and a hanger for hanging the light assembly. The light source may be any type of light source capable of sufficiently illuminating a work area by itself or when optionally combined with auxiliary light sources as discussed below. The hanger may define an adjustable gap. The adjustable width opening defined by the hanger may, for example, be adjusted to receive the tailgate of a truck, such that the light assembly is mounted to the tailgate of a truck.

In another embodiment, the light assembly includes an extension cord connected to any light sources contained in the main housing. The extension cord may include an electrical connector for use with a power outlet, such as a trailer power outlet found on most pickup trucks. The extension cord may be capable of being stored in a compartment configured within the main housing.

In another embodiment, wing housings are included that may provide protection for the light source of the main housing when folded toward the main housing. The wing housings may contain wing light sources, and the wing housings containing the wing light sources may be pivotable to aid in further illuminating a work area and to prevent constant re-mounting of the light source.

Numerous objects, features and advantages of the present invention will be readily apparent to those skilled in the art upon a reading of the following disclosure when taken in conjunction with the accompanying drawings.

DETAILED DESCRIPTION OF THE INVENTION

Figure 1:
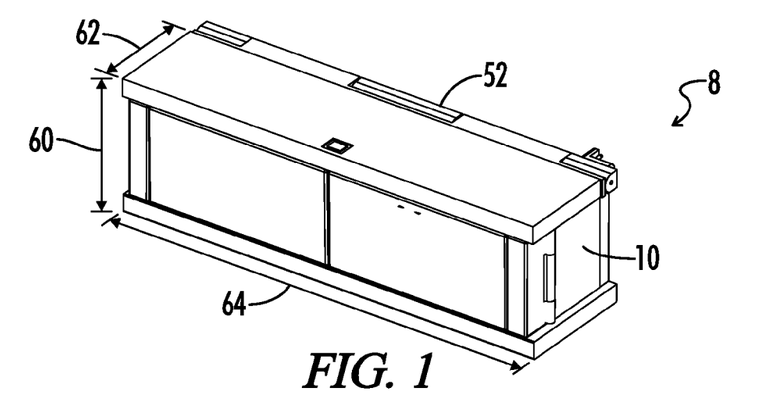
FIG. 1 shows a top front right side perspective view of one embodiment of the mountable light assembly.
Figure 2:
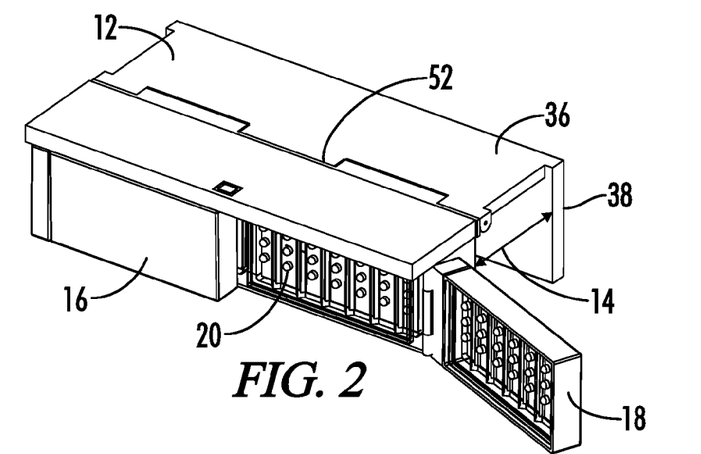
FIG. 2 depicts the mountable light assembly of FIG. 1 with the hanger in a partially opened position, and with one wing housing open.
Figure 3:
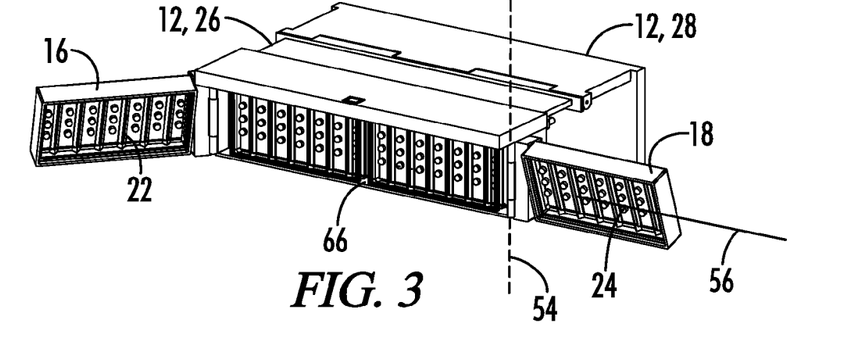
FIG. 3 depicts the mountable light assembly of FIG. 1 with both wing housings in open positions and with the hanger further opened.
Figure 4:
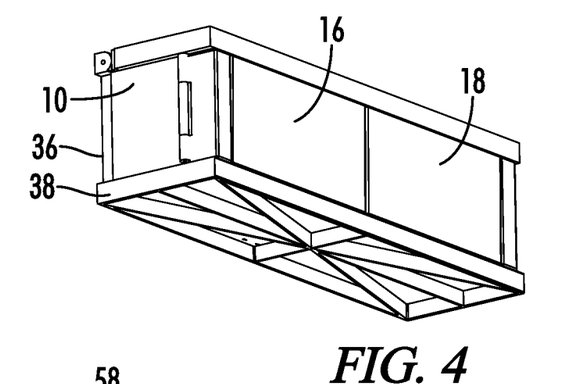
FIG. 4 shows a front left side perspective view from the underside of the mountable light assembly of FIG. 1 in a closed position.
Figure 6:
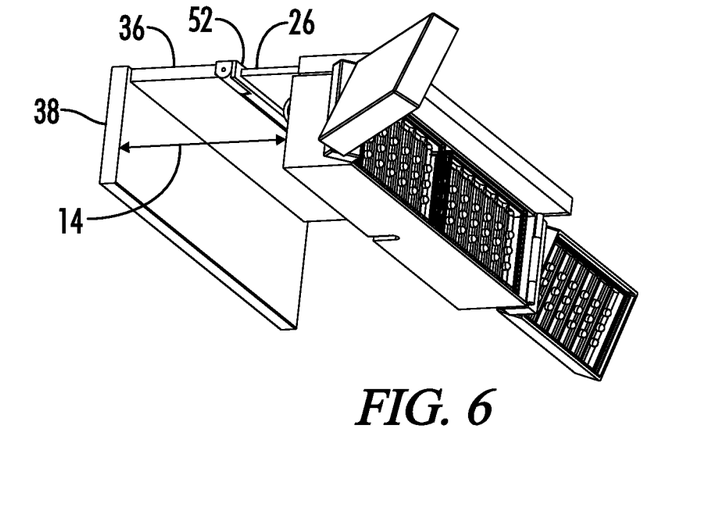
FIG. 6 illustrates the mountable light assembly of FIG. 4 with both wing housings in open positions and with the hanger further opened.
Figure 7:
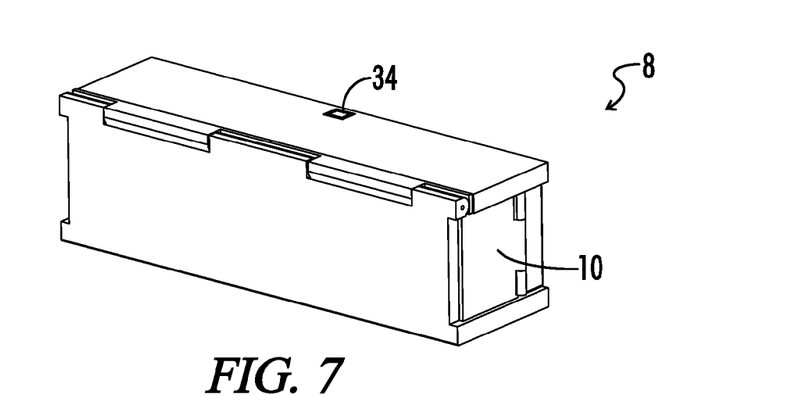
FIG. 7 depicts a rear perspective view of the mountable light assembly of FIG. 1.
Figure 9:
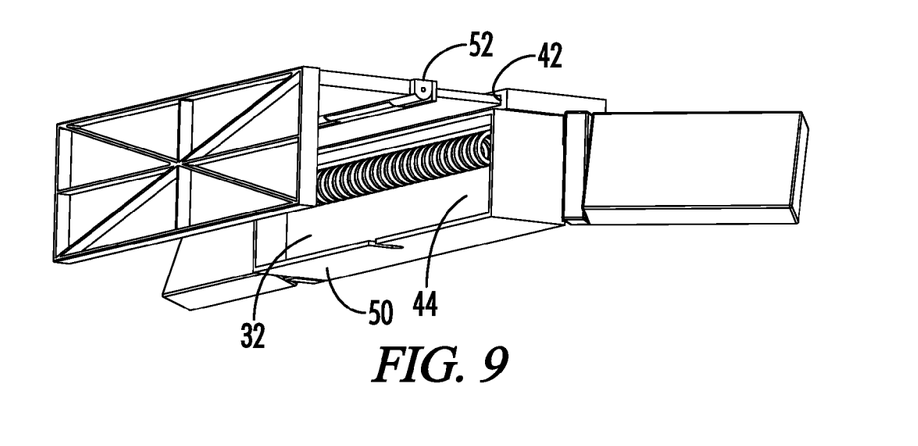
FIG. 9 depicts the mountable light assembly of FIG. 8 with the hanger fully open and with both wing housings open.

As shown in FIG. 1, one embodiment of the mountable light assembly 8 includes a main housing 10. The main housing 10 may be comprised of a durable material capable of resisting ordinary wear and tear associated with heavy work. For example, the main housing 10 may comprise an injection molded material, such as acrylonitrile butadiene styrene (ABS). As shown in FIG. 2, the light assembly has a hanger 12 and a main light source 20. The hanger 12 is pivotally connected via pivotal connection 52 to the main housing 10 and moveable between an operating position as shown in FIGS. 3, 6, and 9, and a storage position as shown in FIGS. 1, 4, and 7. The operating position can also be referred to herein as an open or extended position. The storage position may also be referred to herein as a retracted or closed position. The hanger 12 defines an adjustable gap 14 for hanging the light assembly when the hanger 12 is in the operating position.

The hanger 12 may be held in a selected open position via retainer mechanism 40, described below.

Figure 10:
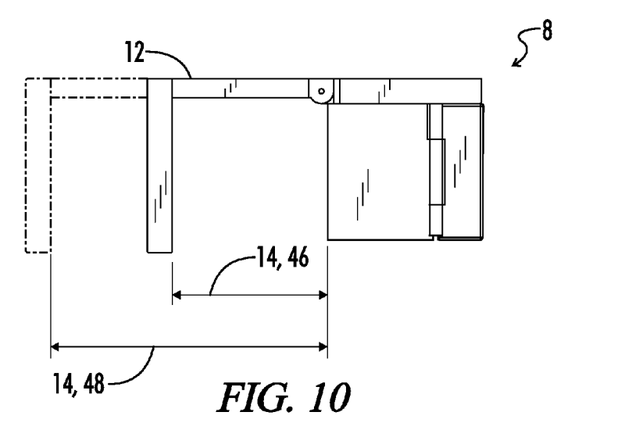
FIG. 10 is a cross sectional view of the mountable light assembly showing the minimum and maximum widths of the adjustable gap.
Figure 12:
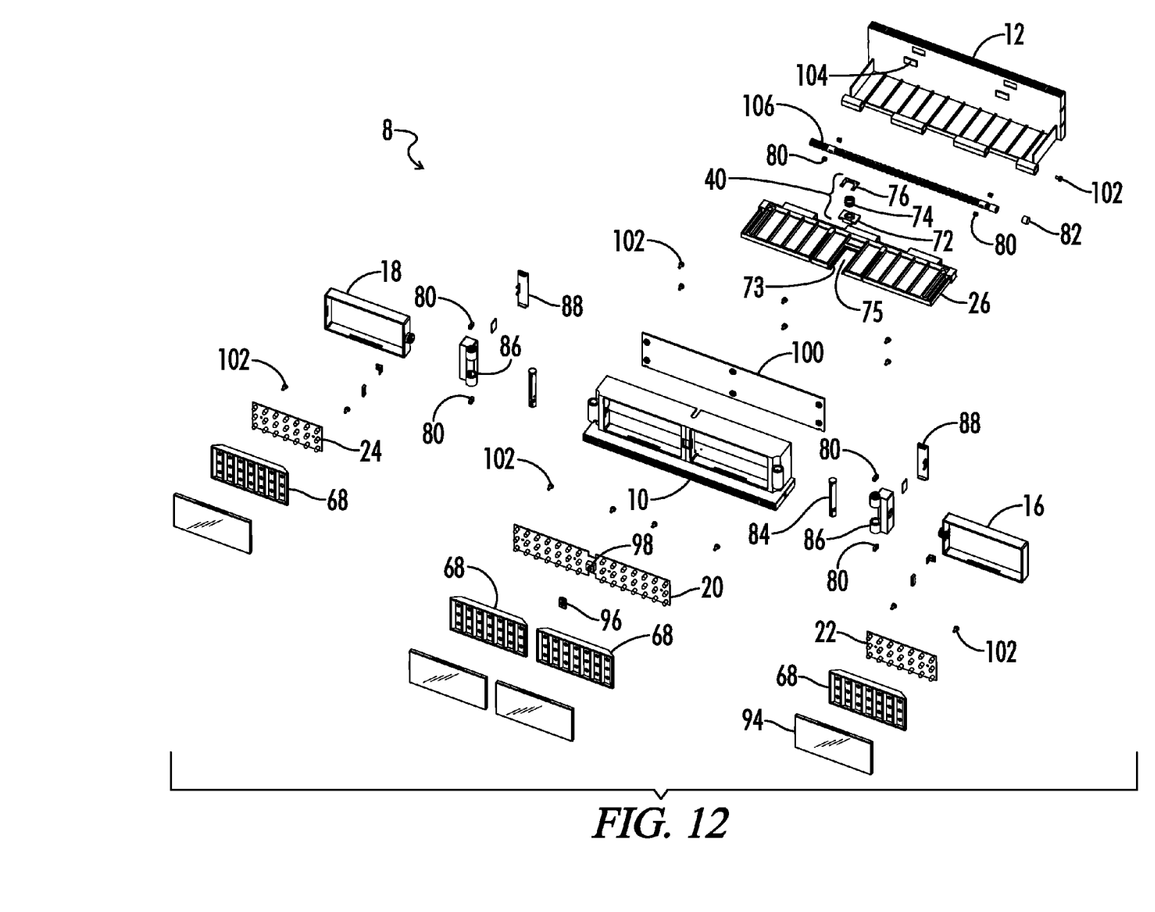
FIG. 12 is an exploded view of the mountable light assembly.
Figure 13:
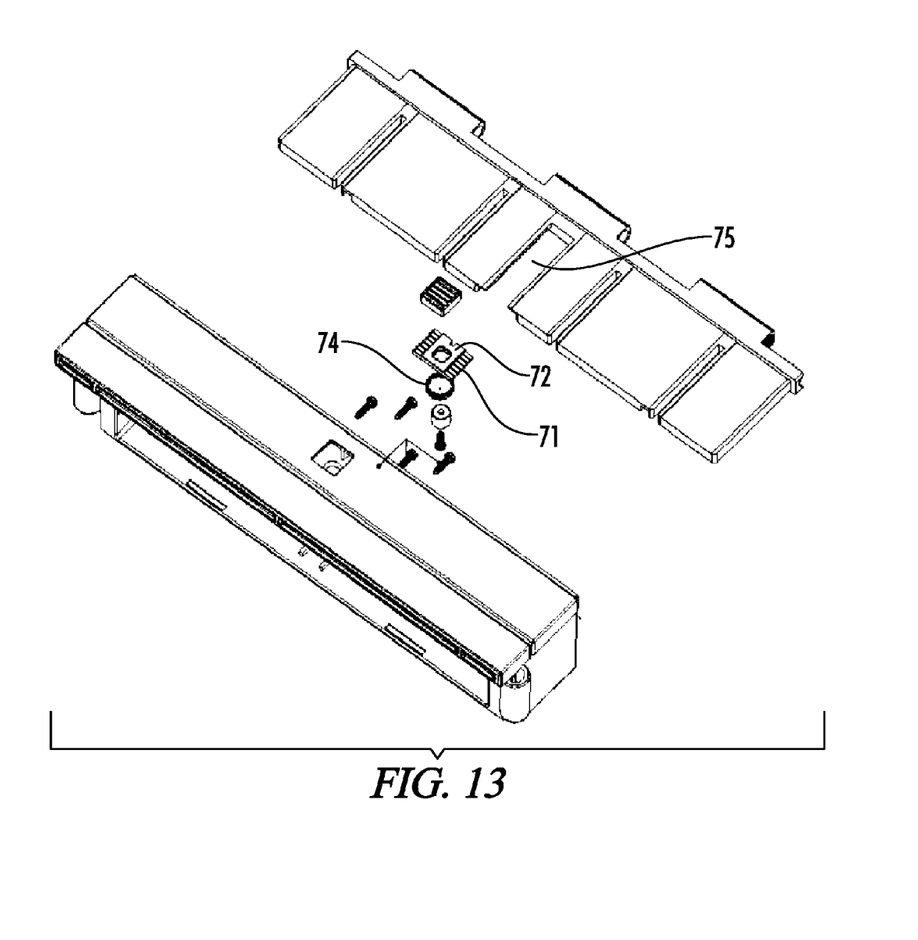
FIG. 13 is a partial exploded view from the underside of the mountable light assembly.

As shown in FIG. 3, the hanger 12 may further include an extension piece 26, also referred to herein as an extension member or sliding part. The extension piece 26 may be designed to be slideably received in an opening 42 on the back 44 of the main housing 10, as shown in FIG. 9, and may be used to lengthen or shorten the width of the adjustable gap 14 from a minimum gap width 46 to a maximum gap width 48, as shown in FIG. 10. The extension piece 26 may also be configured to be held in a selected open position via a retainer 40, as shown in FIGS. 12 and 13, after a width for the adjustable gap 14 has been selected. For example, the retainer mechanism 40 may comprise a button 72, a spring 74, and a spring fix set 76, as shown in FIG. 12. The button 72 includes teeth 71 that engage teeth 73 on the bottom side of edges of a slot 75 defined in extension piece 26. This spring loaded engagement of teeth 71 and 73 retain the extension piece 26 in a selected extended position relative to main housing 10. A button cover 34 is included as shown in FIG. 7. A user may selectively engage the retainer mechanism by pressing the button cover 34.

The hanger 12 may also include a cover piece 28, also referred to herein as a cover member. The extension piece 26 may connect to the cover piece 28 in a pivotable manner via pivotal connection 52 so as to define an adjustable gap 14 between the main housing 10 and the cover piece 28. For example, the pivotal connection 52 may be comprised of a rotation shaft 106 configured to connect the extension piece 26 and the cover piece 28, as shown in FIG. 12. The pivotal connection 52 may further include a limit fix 80, as shown in FIG. 12, configured to prevent over-rotation of the cover piece 28. A stopper 82, as shown in FIG. 12, may be used to hold the rotation shaft 106 in place and prevent the rotation shaft 106 from separating from the extension piece 26 and the cover piece 28.

The cover piece 28 may optionally be configured so that it covers the back 44 of the main housing 10 and the bottom 50 of the main housing 10 when in a closed position as shown in FIGS. 1, 4, and 7.

The pivotal connection 52 may include a spring loaded rotational detent configured to hold the cover piece 28 in a selected rotational position relative to extension piece 26.

Figure 11:
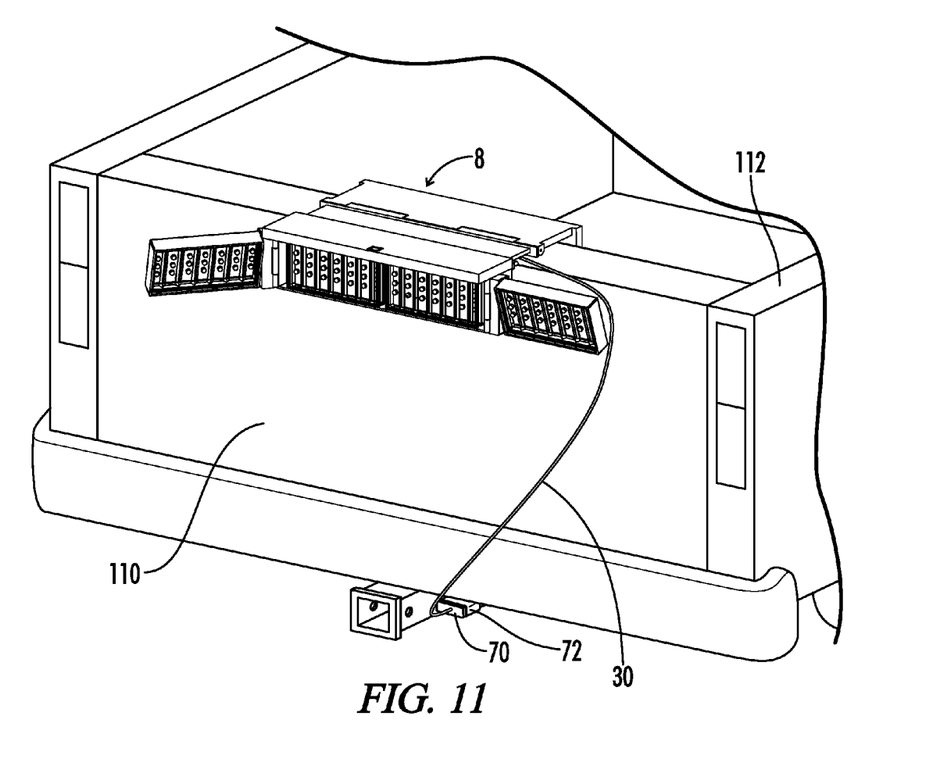
FIG. 11 schematically illustrates the mountable light assembly mounted on a tailgate of a pickup truck.

The cover piece 28 may include magnets 104, as shown in FIG. 12, arranged to engage a truck tailgate 110 to hold the light assembly in place as seen in FIG. 11.

The cover piece 28 of the light assembly may further include a back cover panel 36 and a bottom cover panel 38, rigidly connected together, as shown in FIG. 2. For example, the back cover panel 36 and a bottom cover panel 38 may be molded together as a unitary piece or may be glued, welded, or otherwise adhered to each other. The back cover panel 36 may be pivotally connected via pivotal connection 52 to the extension piece 26 so that the back cover panel 36 can pivot between the operating position and the storage position. The back cover panel 36 may substantially cover the back 44 of the main housing 10. The bottom cover panel 38 may likewise substantially cover the bottom 50 of the main housing 10. The back cover panel 36 and the bottom cover panel 38 may be comprised of a material that will aid in providing additional protection to the main housing 10 in the event that the light assembly is dropped onto a hard surface or is otherwise subject to physical stress, such as if a heavy object is laid on top of the light assembly. For example, the back cover panel 36 and the bottom cover panel 38 may comprise an injection molded material, such as ABS.

In an alternative embodiment (not shown), instead of having the cover piece 28 pivotally connected to the extension piece 26, as described above, the cover piece 28 may be configured to directly connect to the main housing 10. In such a configuration, the extension piece 26 may be configured to be slideably received in an opening defined in the back cover panel 36 of the cover piece 28.

Figure 5:
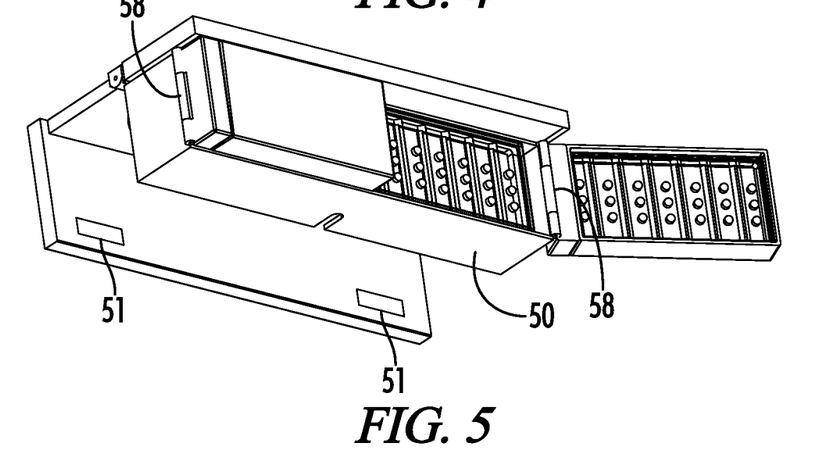
FIG. 5 illustrates the mountable light assembly of FIG. 4 with the hanger in a partially opened position, and with one wing housing open.

The light assembly optionally includes wing housings 16, 18 as shown in FIG. 2. The wing housings are also referred herein as auxiliary housings. The light assembly may include one wing housing or a plurality of wing housings. The wing housings 16, 18, may be moveable between extended positions as shown in FIG. 3 wherein the wing housings 16, 18 extend away from the main housing 10 and retracted positions as shown in FIG. 1 wherein the wing housings 16, 18 cover the front 66 of the main housing 10. As seen in FIGS. 3 and 6, the wing housings or auxiliary housings 16, 18 can be configured to be adjustable in multiple directions and about multiple axes. For example, as shown in FIGS. 3 and 6, the wing housings 16, 18 may be pivotally adjustable about both a vertical axis 54 and a horizontal axis 56 relative to the main housing 10, so that the wing housings 16, 18 have a multi-axial selective directional orientation to the main housing 10. The wing housings 16, 18 may be connected or attached to the main housing 10, for example, by a hinge, a pivot joint, or a swivel. For example, the wing housings may be connected to the main housing 10 via hinge 58, as shown in FIG. 5.

The hinge 58 may comprise a rotation shaft 84, as shown in FIG. 12. As further shown in FIG. 12, the wing housings 16, 18 may be connected to the main housing 10 via a rotation member 86. The rotation member 86 may include a rotation member cover panel 88 to access the inside of the rotation member 86. The hinge 58 may include a spring loaded rotational detent configured to hold the wing housing 16, 18 in a selected rotational position relative to main housing 10.

The wing housings 16, 18 can be attached to any side of the main housing 10. The wing housings 16, 18 may also be configured to substantially cover the front 66 or other sides of the main housing 10. For example, in one embodiment, as shown in FIGS. 1, 4, and 7, the wing housings 16, 18 may be configured in such a way that the wing housings 16, 18 cover the main light source 20. Thus, the wing housings 16, 18 may serve to protect the main housing 10 or the main light source 20 with respect to common physical stresses or forces encountered during completion of ordinary work tasks. For example, the wing housings 16, 18 may protect the main light source 20 and main housing 10 in the event that the light assembly is dropped.

It may be useful for the optional wing housings 16, 18 to include a cavity therein to house light sources. Thus, the wing housings may also include wing lights or wing light sources 22, 24 as shown in FIG. 3. The wing lights or wing light sources 22, 24 may also be referred herein as auxiliary lights or auxiliary light sources. The wing light sources 22, 24 may be mounted or attached to the side of the wing housings 16, 18 that face the main housing 10 when the light assembly is in the closed position.

The light sources according to one embodiment of the present invention, including the main light source 20 and any auxiliary or wing light sources 22, 24, may be light emitting diodes, incandescent lights, florescent lights, halogen lights, tungsten lights, high or low pressure sodium lights, mercury vapor lights, or any other types of light sources known in the art. The light source or light sources may combine to emit light exceeding about 1000 lumens. The brightness of the lights should be such that a working area that otherwise would not be operational due to lack of light is sufficiently illuminated to allow for various tasks to be completed during, for example, nighttime operation, during a blackout, or when other light sources do not provide sufficient light. The light sources may also be accompanied by a reflector 68, as shown in FIG. 12, to enhance the brightness of the light emitted from the light sources. The light sources may also be protected and covered by a lens or transparent cover plate 94, as shown in FIG. 12.

In order to access the internal wiring to the light sources and to otherwise aid in repairing the light assembly, a back access panel 100, as shown in FIG. 12, may be provided to cover the back of the main housing 10. The back access panel 100 may be attached, as well as other pieces of the assembly, with fastening elements 102.

As further shown in FIG. 12, an on/off or power button 96 may be connected to a switch 98 that controls power provided to the light sources. The power button 96 may be protected from being accidentally pressed by configuring the wing housings 16, 18 to guard the power button 96 when the wing housings 16, 18 are retracted. The power button 96 may also be configured to automatically shut off power to the light sources when the wing housings 16, 18 are moved to the storage position.

The adjustable hanger 12 according to one embodiment of the present invention may be adjustable such that the width of the adjustable gap 14 has a minimum opening of at least 3.0 inches and a maximum opening of no greater than 5.0 inches.

The adjustable hanger 12 may be designed to receive a tailgate 110 of a vehicle 112, such as a truck 112, such as shown in FIG. 11. The adjustable gap 14, however, may also be designed to receive a door of a vehicle, the glass portion of a window of a vehicle, the side wall of a truck bed or other vehicle bed, a protruding edge on a piece of heavy machinery, (e.g. a generator, a dump truck, a bulldozer) and any other edge of a vehicle or any piece of work equipment. In particular, for an adjustable gap 14 designed to receive a tailgate of a pickup truck, it has been found that a range of from about 3.18 inches to about 4.68 inches will fit over most modern pickup truck tailgates.

The light assembly optionally includes gripping protrusions or gripping pads 51 attached to the hanger 12, as shown in FIG. 5. The gripping protrusions 51 may also be attached to the main housing 10 or both the hanger 12 and the main housing 10 or other parts of the light assembly. The gripping protrusions 51 may face each other across the opening 14 for gripping the edge of the tailgate 110 as described above. The gripping protrusions 51 may be resilient and should be designed such that they aid in maintaining the light assembly in a relatively fixed position when the hanger 12 is attached to a vehicle or any other piece of work equipment. The gripping protrusions 51 may be comprised of any resilient material such as a synthetic or natural rubber, polystyrene foam, or a number of other plastic materials. The gripping protrusions 51 may be configured to increase the friction between the light assembly and an object the light assembly may be mounted on, such that the light assembly is more securely fixed in place when mounted. For example, the gripping pads 51 may aid in securing the light assembly to the working equipment while the working equipment is vibrating.

Figure 8:
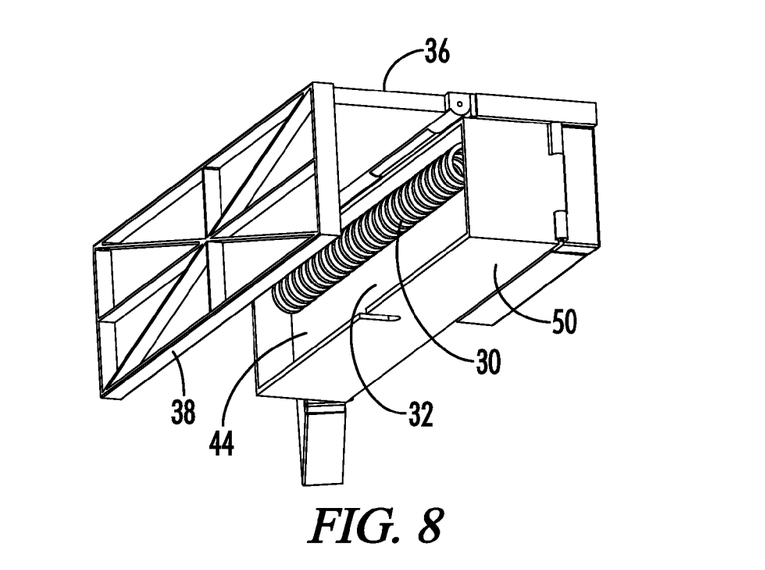
FIG. 8 depicts a rear perspective view of the mountable light assembly of FIG. 1 with the hanger in a partially opened position, and with one wing housing open.

The light assembly may also include a storage cavity or storage compartment 32 as shown in FIG. 8. The storage cavity 32 may be configured to hold an extension cord 30, as shown in FIG. 8. The cord 30 may be operable to provide power to at least one of the light sources. The extension cord 30 should include an electrical connector 70, as shown in FIG. 11, configured to be connected to a power outlet, a receptacle, or any other power point, or otherwise be configured to receive an electrical connector or adaptor. The electrical connector 70 may be any one of a number of connectors known in the art. For example, the electrical connector 70 may be configured to receive power from a trailer power receptacle 72, as shown in FIG. 11, or a DC accessory power outlet. For example, the electrical connector 70 could be adapted to receive power from a four-way, five-way, six-way, or seven-way flat or round trailer plug. The electrical connector 70 may also be used with an adaptor such that the extension cord 30 may be capable of receiving power from any type of power outlet. The power outlets or plugs disclosed herein are only exemplary of those known in the art and many other power outlets will fall within the scope of this invention. The light assembly can optionally be temporarily powered by battery power.

The extension cord 30 may be concealed within the cavity 32 when the hanger 12 is in a closed position. The extension cord 30 may also be designed to coil inside the storage cavity 32. The storage cavity 32 may further be capable of holding a number of other work pieces, including small tools, a small flashlight, batteries, or replacement light bulbs for the light sources. A storage cavity may be formed in the main housing 10 or in one or more of the optional wing housings 16, 18.

When the light assembly is in a closed or storage position as shown in FIGS. 1, 4, and 7, the light assembly should be easily portable. For example, in one embodiment of the invention, the main housing has a height 60 of about 3¾ inches, width 62 of about 3½ inches, and length 64, no greater than about 12 inches. Thus, the light assembly may also be storable in a typical toolbox having an internal length of 12 inches.

The light assembly may also be configured to be weather resistant, water resistant, or waterproof. Further, the light assembly may have numerous indicia printed therein, including tick marks for measurement purposes.

Thus, although there have been described particular embodiments of the present invention of a new and useful light assembly it is not intended that such references be construed as limitations upon the scope of this invention except as set forth in the following claims.

What is claimed is:

1. A light assembly, comprising:
a main housing having a back and a bottom;
a main light source mounted on the main housing; and
an adjustable hanger pivotally connected to the main housing and pivotable between an operating position and a storage position, the hanger defining an adjustable gap for hanging the light assembly when the hanger is in the operating position, and the hanger covering the back and bottom of the main housing when the hanger is in the storage position.

2. The light assembly of claim 1, wherein:
the main housing has a front, the light source projecting light forward from the main housing; and
the light assembly further comprises first and second wing housings connected to the main housing, each of the wing housings being moveable between extended positions wherein the wing housings extend away from the main housing, and retracted positions wherein the wing housings cover the front of the main housing.

3. The light assembly of claim 2, further comprising:
first and second wing lights mounted on the first and second wing housings respectively, the wing lights being exposed when the wing housings are in the extended positions and the wing lights being concealed when the wing housings are in the retracted positions.

4. The light assembly of claim 3, wherein:
the wing housings are pivotally connected to the main housing.

5. The light assembly of claim 3, wherein:
the wing housings are pivotally adjustable about both a vertical axis and a horizontal axis relative to the main housing, so that the wing lights have a multi-axial selective directional orientation to the main housing.

6. The light assembly of claim 1, wherein:
the back of the main housing and the hanger define an enclosed storage cavity when the hanger is in the storage position; and
the light assembly further comprises an extension cord connected to the light source and concealed in the storage cavity when the hanger is in the storage position.

7. The light assembly of claim 1, wherein:
the main housing has a slot defined therein; and
the hanger includes a sliding part slideably received in the slot of the main housing, the sliding part sliding in the slot to adjust the adjustable gap when the hanger is in the operating position.

8. The light assembly of claim 7, wherein:
the hanger further includes a back cover panel and a bottom cover panel rigidly connected together, the back cover panel being pivotally connected to the sliding part so that the back cover panel can pivot between the operating position and the storage position.

9. The light assembly of claim 1, wherein:
the main housing has a length of no greater than about twelve inches.

10. The light assembly of claim 1, wherein:
the adjustable hanger further comprises an extension member and a cover member, the extension member being connected to the cover member;
the pivotal connection between the adjustable hanger and the main housing is the connection between the extension member and the cover member; and
the extension member is configured to slide into the main housing.

11. A light assembly for use with a vehicle, the vehicle including a tailgate and a trailer power outlet, the light assembly comprising:
a housing;
a light source connected to the housing;
an extension cord connected to the light source, the extension cord including an electrical connector configured to be connected to the trailer power outlet; and
an adjustable hanger connected to the housing and having configured to maintain an adjustable width opening for receiving the tailgate of the vehicle to hang the light assembly from the tailgate.

12. The light assembly of claim 11, wherein:
the adjustable width opening has a minimum opening of at least 3.0 inches and a maximum opening of no greater than 5.0 inches.

13. The light assembly of claim 11, further comprising:
resilient gripping protrusions attached to the hanger and the housing, the gripping protrusions facing each other across the opening for gripping the tailgate.

14. The light assembly of claim 11, wherein:
the light source includes a plurality of light emitting diode display lights.

15. The light assembly of claim 11, further comprising:
a retainer configured to hold adjustable hanger in a selected open position.

16. The light assembly of claim 11, wherein:
the adjustable width opening does not exceed 5.0 inches.

17. A light assembly, comprising:
a main housing having first and second ends, a length defined between the ends, a front, a back, a top and a bottom;
first and second wing housings pivotally connected to the first and second ends of the main housing, the wing housings being pivotable over an adjustable range of angles extended away from the main housing, and the wing housings being pivotable to closed positions wherein the wing housings cover the front of the main housing;
a main light source mounted on the front of the main housing;
first and second wing light sources mounted on the first and second wing housings, respectively; and
a hanger pivotally mounted relative to the main housing so that the hanger is pivotable from a storage position wherein the hanger covers the back and the bottom of the main housing, to an operating position wherein the hanger extends from the main housing to define a hanger opening.

18. The light assembly of claim 17, wherein:
the back of the main housing has a cavity defined therein, the hanger enclosing the cavity when the hanger is in the storage position; and
the light assembly further comprises an extension cord connected to the light source and concealed within the cavity when the hanger is in the storage position.

19. The light assembly of claim 17, wherein:
the hanger is adjustably connected to the main housing so that when the hanger is in the operating position the hanger opening is adjustable.

20. The light assembly of claim 17, wherein:
the light sources each include a plurality of light emitting diode display lights.

21. The light assembly of claim 17, further comprising:
an extension cord connected to the main light source, the extension cord including an electrical connector configured to be connected to a power outlet.

22. The light assembly of claim 17, wherein:
at least one wing housing is pivotable about an axis substantially parallel to the front of the housing.

23. The light assembly of claim 17, wherein:
the light sources combine to emit light exceeding 1000 lumens.

24. A light assembly for use with a vehicle, the vehicle including a tailgate and a trailer power outlet, the light assembly comprising:
a housing including a bottom and back;
a light source connected to the housing;
an extension cord connected to the light source, the extension cord including an electrical connector configured to be connected to the trailer power outlet; and
an adjustable hanger connected to the housing and including:
an adjustable width opening for receiving the tailgate of the vehicle to hang the light assembly from the tailgate;
a slideable extension plate slideably connected to the housing; and
a cover piece hingeably connected to the slideable extension plate and pivotable between an operating position wherein the adjustable width opening is defined between the back and the cover piece, and a storage position, wherein the cover piece covers the bottom and back of the housing.

25. The light assembly of claim 24, further comprising:
a storage compartment formed in the housing, the compartment being configured to store the extension cord, the storage compartment being covered by the cover piece when the cover piece is in a storage position.

* * * * *